(12) United States Patent
Zhou et al.

(10) Patent No.: US 10,639,638 B2
(45) Date of Patent: May 5, 2020

(54) FLEXIBLE POLISHING APPARATUS FOR GRANULATED GRAINS

(71) Applicant: HUNAN HAILIAN GRAIN & QIL S&T CO., LTD, Zhuzhou, Hunan (CN)

(72) Inventors: Ying Zhou, Zhuzhou (CN); Heping Zhou, Zhuzhou (CN)

(73) Assignee: Hunan Hailian Grain&Qil S&T Co., Ltd., Hunan (CN)

( * ) Notice: Subject to any disclaimer, the term of this patent is extended or adjusted under 35 U.S.C. 154(b) by 428 days.

(21) Appl. No.: 15/510,895

(22) PCT Filed: Jun. 26, 2015

(86) PCT No.: PCT/CN2015/082430
§ 371 (c)(1),
(2) Date: Mar. 13, 2017

(87) PCT Pub. No.: WO2016/045422
PCT Pub. Date: Mar. 31, 2016

(65) Prior Publication Data
US 2017/0239665 A1    Aug. 24, 2017

(30) Foreign Application Priority Data
Sep. 23, 2014    (CN) .......................... 2014 1 0489141

(51) Int. Cl.
*B02B 3/10* (2006.01)
*B02B 7/02* (2006.01)
(Continued)

(52) U.S. Cl.
CPC ............... *B02B 3/10* (2013.01); *A23L 7/197* (2016.08); *B02B 5/02* (2013.01); *B02B 7/02* (2013.01); *A23V 2002/00* (2013.01)

(58) Field of Classification Search
CPC .. B02B 3/00; B02B 3/04; B02B 3/045; B02B 3/10; A23N 5/00; A23N 5/002;
(Continued)

(56) References Cited

U.S. PATENT DOCUMENTS 2,164,338 A * 7/1939 McGill ..................... B02B 3/00
99/617
2,282,718 A * 5/1942 Fujioka ................... B02B 3/045
241/DIG. 30
(Continued)

FOREIGN PATENT DOCUMENTS

CN          202447124 U       9/2012
CN          102430441 B *     7/2013    ............... B02B 3/04
(Continued)

OTHER PUBLICATIONS

Translation of JP201-246271A (Year: 2001).*
Translation of CN102430441B (Year: 2013).*

*Primary Examiner* — Tu B Hoang
*Assistant Examiner* — Erin E McGrath
(74) *Attorney, Agent, or Firm* — Wang Law Firm, Inc.

(57) ABSTRACT

A flexible polishing apparatus for granulated grains is provided. The flexible polishing apparatus includes a housing, a feeding device, at least one flexible polishing unit, a bran discharging device, and a rice outlet. The flexible polishing unit includes a radial gravity self-flow flexible polishing chamber. The feeding device, the flexible polishing chamber and the rice outlet are sequentially arranged from top to bottom along the gravity direction. The flexible polishing apparatus for granulated grains avoids the shear effect of granulated grains in the polishing chamber, improves the flexible friction effect, and greatly reduces the damage to rice in the polishing process while ensuring that rice bran is (Continued)

cleaned and the rice is polished, thereby improving the rate of polished rice and reducing energy consumption.

12 Claims, 7 Drawing Sheets

(51) Int. Cl.
  *B02B 5/02* (2006.01)
  *A23L 7/10* (2016.01)
(58) Field of Classification Search
  CPC ........ A23N 5/004; A23N 5/006; A23N 5/008; A23N 5/01; A23N 5/08; A23N 7/00; A23N 2007/007
  USPC ......... 99/488, 539, 540, 567, 568, 569, 574, 99/584, 585, 586, 600, 601, 602, 608, 99/609, 610, 611, 612, 613, 617, 618, 99/620, 623, 624, 625, 626
  See application file for complete search history.

(56) References Cited

U.S. PATENT DOCUMENTS

| | | | |
|---|---|---|---|
| 2,633,885 A | | 4/1953 | Leonhard |
| 5,209,158 A | * | 5/1993 | Salete ...................... B02B 3/02 99/519 |
| 2005/0076797 A1 | * | 4/2005 | Van der Schoot ..... A23N 15/08 99/623 |
| 2007/0151585 A1 | * | 7/2007 | Ishizuka ................... B02B 1/02 134/134 |

FOREIGN PATENT DOCUMENTS

| | | | | |
|---|---|---|---|---|
| CN | 104209156 A | | 12/2014 | |
| JP | 2001246271 A | * | 9/2001 | ............... B02B 3/10 |
| JP | 2001246271 A | | 9/2001 | |

* cited by examiner

FLEXIBLE POLISHING APPARATUS FOR GRANULATED GRAINS

This application claims priority from China Patent Application No. 201410489141.4, filed on Sep. 23, 2014, and titled "flexible polishing apparatus for granulated grains" in State Intellectual Property Office of the People's Republic of China, the content of which is hereby incorporated by reference in its entirety.

TECHNICAL FIELD

The present invention belongs to the technical field of grain processing, and specifically relates to a flexible polishing apparatus for granulated grains.

BACKGROUND ART

All kinds of granulated grains usually need to be polished at varying degrees. The polishing is to remove the bran powder, tiny moth eggs and peaks (microscopically irregular curves looking like mountain peaks) on the surface of the granulated grains with the use of external force, so that the surface of the granulated grains is clean or is ground (or milled) to be a smooth surface (mirror surface). The grade of products largely depends on the degree of polishing. For example, rice is classified into highly polished rice (such as special grade rice and clean polished rice), lowly polished rice (such as first-grade rice and second-grade rice), unpolished rice and brown rice, the latter three of which usually need moderate polishing. Take the polishing of brown rice as an example, only the bran powder and tiny moth eggs on the surface need to be polished away, with the original color and luster of the rice remained; it is the same for coarse cereals such as wheat, corn and soybean (excluding potatoes). Therefore, the degree of polishing on granulated grains varies with the popularization of nutrition knowledge. As far as rice is concerned, the highly polished rice previously sought after by consumers has become more and more unpopular, while brown rice, unpolished rice and lowly polished rice have become a favorite that consumers rush to buy, as if they buy a local dish. The three kinds of rice have respective shortcomings. With the bran husk and germ totally preserved, brown rice has full nutrients and bright colors (for example, black, red and purple), and is welcomed by special people; besides, it has high yield and high processing benefit. However, as the bran husk and germ are rich in crude fiber, bran wax and furfural, brown rice does not taste good, thus having its sales volume limited. Yet, brown rice can avoid mildew and insects, thus being conducive to storage and prolonging the guarantee period or shelf life of the sugar rice. Unpolished rice is unpolished sugar rice. As sugar powder and tiny moth eggs remain on the surface of unpolished rice, unpolished rice is very likely to have moths and mildew. Therefore, it is not popular despite its low price. Compared with brown rice, lowly polished rice has its remaining of bran reduced by 99% on the surface and by ⅔ increases, thus having better taste. Compared with highly polished rice, lowly polished rice contains more bran husks and fewer germs, thus being more nutritional. Besides, due to its lower processing degree, lowly polished rice has higher yield and better processing benefit than highly polished rice.

To meet the moderate polishing requirements of these granulated grains, the design of polishing equipment should fully consider the characteristics of the granulated grains like rice, such as low anti-shear force, certain anti-extrusion force and relatively high anti-friction force; during the polishing process, the granulated grains should completely avoid the shear force, the extrusion force on them should be minimized, and the friction force on it should be increased, so as to cut down the occurrence of broken rice and improve the yield.

In the prior art, the polishing equipment is an axially propelling roll structure. For example, a spirally propelling iron roll polisher which is frequently used, its working principle lies in that a spiral propeller rolls and drives bunchy granulated grains into a flexible polishing chamber composed of a polishing roller and a rice sieve for polishing. During the process when the granulated grains are propelled and polished, the spiral propeller, the iron roll, the rice sieve and the grains produce rigid extrusion, shear and friction that strongly smoothen the surface peaks of the grains; thus, the surface of the grains can achieve a mirror surface effect (like clean polished rice and bright rice). It can be seen that the roll polisher in the prior art can meet the requirement of highly polished rice with high polishing degree. However, when the machine is used to produce brown rice and lowly polished rice, as the grains can not completely be protected from shear force, nor can its extrusion force be reduced and friction force be increased during the polishing process, the skin of the brown rice will be seriously impaired (commonly known as "skin injury"); about 50 of brown rice will become "impaired rice", and the original special color of brown rice will not be maintained. To ensure the surface quality of the brown rice, some manufacturers who are restricted by the polishing equipment cannot but use a spirally propelling roll polisher to forcibly polish the brown rice and get rid of the "impaired rice" massively produced during the polishing process by a color sorter. Such method largely reduces the yield and largely increases the processing cost of brown rice. A strange thing thus happens that it is more costly (over double times costly) to polish brown rice than lowly polished rice. As the lowly polished rice contains a great amount of bran powder on the surface, it is very likely to roughen and mildew; therefore, it is not conducive to storage, its guarantee period or shelf life is reduced, and certain polishing is needed. As previously mentioned, it can only be processed by a spirally propelling roll polisher. Thus, the polishing process not only removes the surface bran powder, but also inevitably polishes away a part of endosperms, thus greatly lowering the yield and nutritive value. Under the combined action of extrusion force, shear force and friction force, the polishing process will produce about 0.5%-1% of bran powder (to be blown away by strong air) and 1%-2% of broken rice.

On the other hand, to produce great extrusion force, shear force and friction force during the working process, the spirally propelling roll polisher in the prior art needs high power configuration and will consume too much energy. For example, a 6.5 TPH spirally propelling roll polisher usually needs to have a 75 KW motor, which will consume 11 Kwh/t of power for polishing.

Persons skilled in this art have made efforts to solve the problem of high broken rice rate. For example, a Chinese patent application, with the application number of 932378048, discloses a rice polisher, which is provided with a rice brushing chamber and a rice polishing chamber that are axially connected and are respectively provided with a spiral propelling head. To reduce the extrusion force on the rice grains, the rice grains are conveyed with the help of an oblique bar on a rice brushing roll and a polishing belt on a polishing roll. It says the broken rice rate is less than 1%. Yet, as the work of the spiral propelling mode on the rice grains is still rigid extrusion by the polishing roll, the problems of high broken rice rate and high energy consumption still exist. Therefore, under the new market conditions, it is a subject for the person skilled in the art to find a solution to the three technical problems of "skin injury", low yield and high energy consumption existing in the polishing equipment of the prior art.

SUMMARY

Aiming to solve the problems existing in the prior art, the present invention provides a flexible polishing apparatus for granulated grains, which is capable of moderately polishing the granulated grains, and has the advantages such as zero skin injury, high yield and low energy consumption.

To overcome these technical problems, the present invention adopts a technical scheme as follows:

a flexible polishing apparatus for granulated grains, comprising a housing, a feeding device, at least one flexible polishing unit, a bran discharging device, and a rice outlet, wherein the flexible polishing unit comprises a radial gravity self-flow flexible polishing chamber; the feeding device, the flexible polishing chamber and the rice outlet are sequentially arranged from top to bottom along the gravity direction.

Further, the flexible polishing chamber is disposed inside the housing; the flexible polishing chamber is enclosed by a rice sieve and a baffle; the center of the flexible polishing chamber is provided with a hollow shaft; the hollow shaft is provided with a flexible polishing member; a feeding inlet and a discharging outlet are respectively formed on the top and bottom of the flexible polishing chamber; the opening direction of the feeding inlet is along the radial direction of the hollow shaft; the hollow shaft is provided with an air inlet and a plurality of blow holes that are interconnected with the flexible polishing chamber; the hollow shaft is driven to rotate by a transmission device.

Further, the flexible polishing member is a polishing brush sleeved outside the hollow shaft; the polishing brush comprises a brush base and brushing hair; the brush base is fixedly sleeved on the periphery of the hollow shaft; the brushing hair is disposed on the brush base; the brush base is provided with a plurality of interconnecting holes corresponding to the hollow shaft.

Further, the flexible polishing member is a polishing cloth strip sleeved outside the hollow shaft.

Further, the feeding device comprises a storage hopper and a spreading pipe; the bottom of the spreading pipe is interconnected with the feeding inlet of the highest flexible polishing chamber in the flexible polishing unit, so that rice radially flows into the flexible polishing chamber from the hollow shaft; the discharging outlet of the lowest flexible polishing chamber in the flexible polishing unit is interconnected with the rice outlet; the bran discharging device is disposed on one side of the rice sieve and is connected with the polishing chamber through a sieve opening on the rice sieve; the bran discharging device comprises a bran discharging air duct inside the housing and a bran discharging hole on the bottom of the bran discharging air duct.

Further, the brushing hair is disposed at 360 degrees on the brush base.

Further, the air inlet is disposed on both ends of the hollow shaft.

Further, the flexible polishing apparatus for granulated grains comprises a plurality of flexible polishing units that are arranged in one or more than one row in the gravity direction; all the flexible polishing units in one row comprise more than one flexible polishing chamber; these flexible polishing chambers are interconnected in the gravity direction; the bottom of the spreading pipe is forked into branch pipes with a number corresponding to the row number of the flexible polishing units; the feeding inlet of the flexible polishing chamber of the highest flexible polishing unit in each row is interconnected with a branch pipe of the spreading pipe, while the discharging outlet of the lowest flexible polishing chamber is interconnected with the rice outlet.

Further, the transmission device comprises motors with a number corresponding to the row number of the flexible polishing units, motor wheels disposed on the output shaft of the motors, driving wheels disposed on the hollow shaft of all the flexible polishing units, and a plurality of driving belts; the motors are fixedly disposed on a pedestal; each motor wheel and a nearest driving wheel above as well as two neighbouring driving wheels from top to bottom are connected through the driving belt.

Further, the transmission device further comprises one or more than one control device that correspondingly controls the rotating speed of each motor; the control device is a frequency converter or servo controller; the control device controls the rotating speed of the hollow shaft to be 300-1500 rpm by controlling the rotating speed of the motor.

The present invention is designed according to the principles that a granulated grain polishing apparatus should completely prevent the grains from being stressed by the shear force, minimize the extrusion force on the grains and increase the friction force on the surface of the grains. The flexible polishing apparatus for granulated grains provided by the present invention avoids the shear effect of granulated grains in the polishing chamber, improves the flexible friction effect, and greatly reduces the damage to the granulated grains in the polishing process while ensuring that rice bran powder on the surface of the granulated grains is cleaned and the granulated grains are polished, thereby improving the rate of polished rice and reducing energy consumption. Besides, it has the following advantages:

1. moderate processing of granulated grains is realized, no skin injury is caused, and the rate of polished rice is improved; as the feeding device, the radial gravity self-flow flexible polishing unit and the rice outlet are sequentially arranged from top to bottom along the gravity direction, granulated grains like rice enter into the radial gravity self-flow flexible polishing chamber of the flexible polishing unit from the feeding device by gravity alone, that is, the granulated grains flow into the flexible polishing chamber along the radial direction of the hollow shaft through the feeding inlet; the granulated grains contact with the rotating flexible polishing member for radial polishing between the rice sieve and the baffle; by means of flexible friction between the rice and the flexible polishing member, semi-rigid friction between the granulated grains and the rice sieve and rigid friction between the granulated grains, the rice bran powder in the surface curve grooves of the granulated grains is stripped off, and peaks that are above the average height of the surface curve of the granulated grains are properly smoothened (not fully ground to the root of the peak); the polished granulated grains flows out of the rice outlet; in comparison with existing spirally propelling roll polishers, the present invention omits the propelling roll; thus, single granulated grains enter into the rotating flexible polishing member of the flexible polishing chamber for radial polishing in a cascading manner from top to bottom; the feeding mode that the granulated grains enter into the flexible polishing chamber by means of radial gravity flow prevents the granulated grains from being stressed by axial thrust in the flexible polishing chamber; thus, when flowing from top to bottom, the granulated grains merely bear their own gravity and the acting force of the rotating polishing brush; consequently, during the polishing process, the shear force is prevented, the extrusion force is minimized, and the friction force is increased by the flexible polishing member like the polishing brush; therefore, the surface of the granulated grains merely endures a slight extrusion force and a large friction force, thereby realizing moderate processing on the granulated grains; the present invention overcomes the skin injury problem of roll polishers in the prior art, which is resulted as the surface pressure of the granulated grains cannot be regulated during the rigid spiral propelling process, prevents broken rice from being produced during the polishing process, and improves the rate of polished rice by 0.5-2% compared with the prior art;

2. a small amount of rice bran powder is produced, and is eliminated timely; as the granulated grains like rice are not deeply ground, but moderately or slightly ground during the polishing process, a small amount of rice bran powder, merely 0.5% below, is produced; the granulated grains are fully rolled during the polishing process; the bran discharging air duct is disposed inside the housing; the flexible polishing member is disposed on the hollow shaft; the hollow shaft is provided with an air inlet and a plurality of blow holes that are interconnected with the flexible polishing chamber; the bran discharging air duct is interconnected with the flexible polishing chamber through the sieve opening on the rice sieve; the bottom of the bran discharging air duct is interconnected with the bran discharging hole; in this way, air entering through the air inlet on the hollow shaft is radially blown into the flexible polishing chamber; it passes through the granulated grains, enters into the bran discharging air duct through the sieve opening on the rice sieve, and is sucked by the blast blower to produce strong air; when the produced rice bran powder is blown away, the granulated grains are fully rolled and uniformly polished, thus bringing about high product percent of pass;

3. the energy conservation effect is significant; as single granulated grains enter into the flexible polishing chamber in a cascading manner from top to bottom without power, the polishing process omits the axial propelling feeding process, and moderate or slight flexible polishing is carried out alone in the flexible polishing chamber, a low-power power unit is needed; usually, a 15 KW power unit (for example, two 7.5 KW motors) needs to be configured for a 7 TPH apparatus weighing 2350 kg; therefore, in comparison with the existing iron roll polisher with a 75 KW motor, the present invention can save about 80% of energy; and 4. the apparatus has small floor space; it can save 50% of floor space compared with the roll polishers in the prior art.

Figure 1:
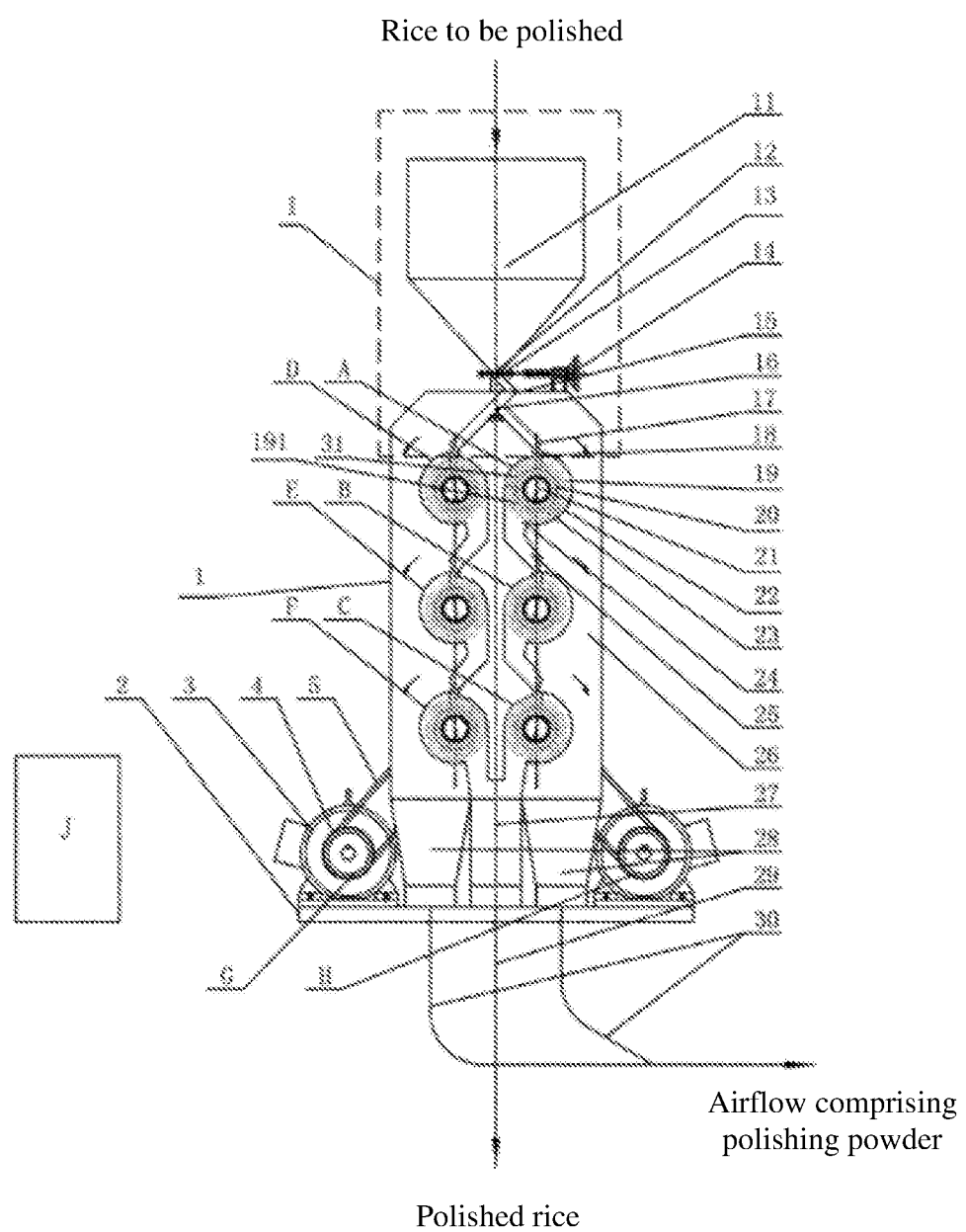
FIG. 1 is a structural schematic figure of a flexible polishing apparatus for granulated grains according to an embodiment of the present invention.

Reference numbers in the drawings of the specification are as follows:

100-flexible polishing apparatus for granulated grains; 1-housing; 2-pedestal; 3-motor; 4-motor wheel; 5-driving belt; 6-driving wheel; 7-driving belt; 8-driving wheel; 9-driving belt; 10-driving wheel; 11-storage hopper; 12-feeding inlet of polishing apparatus; 13-balancing insert plate; 14-flow regulating lever; 15-spreading pipe; 16-distribution board; 17-feed chute; 18-feeding inlet; 19-polishing brush; 191-brushing hair; 20-brush base; 21-hollow shaft; 211-air inlet; 212-blow hole; 22-rice-sieve; 23-baffle; 24-discharging outlet; 25-discharge chute; 26-bran discharging air duct; 27-rice outlet; 28-bran discharging hole; 29-slide pipe; 30-air pipe; 31-flexible polishing chamber; 40-first pipe; 50-bran and fine broken rice separator; 60-first collecting hopper; 70-vibrating fine broken rice sieve; 80-second pipe; 90-cyclone dust collector; 101-first airlock; 110-diverter; 120-third pipe; 130-blast blower; 140-fourth pipe; 150-bran dust remover; 160-second collecting hopper; 170-second airlock; 180-bran dust remover outlet.

DESCRIPTION OF EMBODIMENTS

The present invention will now be described in further detail with reference to the drawings and embodiments in order to make the technical problem, technical scheme and beneficial effect of the present invention more clear. It should be understood that the specific embodiments described herein are only for the purpose of explaining the present invention and are not intended to be the limit of the present invention.

Figure 2:
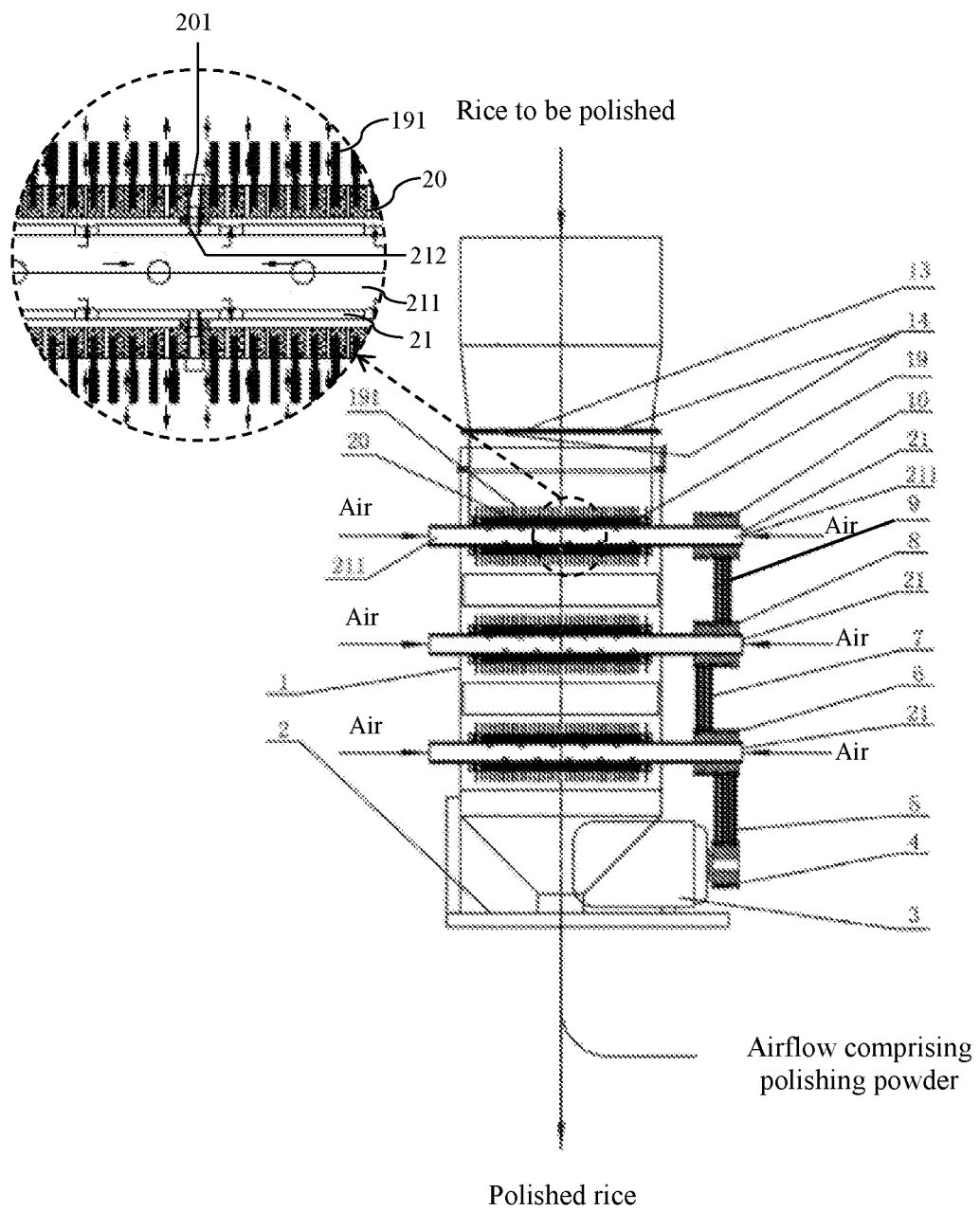
FIG. 2 is an internal structural schematic figure of a flexible polishing apparatus for granulated grains according to an embodiment of the present invention.

As shown in FIG. 1 and FIG. 2, a flexible polishing apparatus 100 for granulated grains according to an embodiment of the present invention comprises a housing 1, a feeding device I, a transmission device, at least one flexible polishing unit, a bran discharging device, and a rice outlet 27, wherein the flexible polishing unit comprises a radial gravity self-flow flexible polishing chamber 31 (hereinafter referred to as flexible polishing chamber); the feeding device I, the flexible polishing chamber and the rice outlet 27 are sequentially arranged from top to bottom along the gravity direction. Here, the radial gravity self-flow polishing chamber means that the polishing chamber is disposed along the gravity direction, and granulated grains enter into the polishing chamber along the gravity direction and flow out of the polishing chamber along the gravity direction.

In this embodiment, the flexible polishing apparatus for granulated grains is described with reference to an example of rice polishing. It should be understood that the flexible polishing apparatus for granulated grains provided by this embodiment is also suitable for the polishing of grains such as wheat, corn and soybean.

In this embodiment, the feeding device I comprises a storage hopper 11 and a spreading pipe 15; the top of the spreading pipe 15 is interconnected with the bottom of the storage hopper 11. The connection part between the storage hopper 11 and the spreading pipe 15 forms a feeding inlet 12 of the polishing apparatus; a balancing insert plate 13 is disposed in the feeding inlet 12; the balancing insert plate 13 is externally connected with a flow regulating lever 14; the position of the flow regulating lever 14 can be adjusted so that the balancing insert plate 13 partially or fully shields the feeding inlet 12 of the polishing apparatus, thereby adjusting the feeding flow. The bran discharging device comprises a bran discharging air duct 26 and a bran discharging hole 28.

In this embodiment, the flexible polishing unit A as shown in FIG. 1 is taken as an example; the flexible polishing chamber 31 is disposed inside the housing 1; the flexible polishing chamber 31 is enclosed by a rice sieve and a baffle 23; each flexible polishing unit comprises the flexible polishing chamber 31, a hollow shaft 21, a polishing brush 19, the rice sieve 22 and the baffle 23; a feeding inlet 18 and a discharging outlet 24 are respectively formed on the top and bottom of the flexible polishing chamber 31; the opening direction of the feeding inlet 18 is along the radial direction of the hollow shaft 21; two neighbouring flexible polishing chambers 31 are interconnected; the feeding inlet of the highest flexible polishing chamber 31 is interconnected with the bottom of the spreading pipe 15; the discharging outlet of the lowest flexible polishing chamber 31 is interconnected with the rice outlet 27; the rice sieve 22 is disposed on one side of the flexible polishing chamber 31 close to the bran discharging air duct; the baffle 23 is disposed on one side of the flexible polishing chamber 31 opposite to the rice sieve 22; the polishing brush 19 is disposed on the hollow shaft 21; the hollow shaft 21 is provided with an air inlet 211 and a plurality of blow holes 212 that are interconnected with the flexible polishing chamber 31. Preferentially, the air inlet 211 is disposed on both ends of the hollow shaft 21, so that strong air can respectively be sucked from the two ends of the hollow shaft 21 by means of negative pressure produced by a blast blower externally connected to the bran discharging hole 28, thereby facilitating rolling of rice and bran discharge.

In this way, single rice enters into the flexible polishing chamber of the flexible polishing unit in a cascading manner from top to bottom from the storage hopper of the feeding device through the spreading pipe, and the polished rice flows out through the rice outlet. It can be seen that the feeding mode of the flexible polishing apparatus for granulated grains in this embodiment is radial gravity self-flow feeding, which prevents rice breaking caused by the axial feeding of a traditional screw propeller and saves energy.

In this embodiment, the polishing brush 19 is a flexible polishing member. In another embodiment, the flexible polishing member can be a polishing cloth strip sleeved outside the hollow shaft.

In this embodiment, as shown in FIG. 1, the flexible polishing apparatus for granulated grains comprises six flexible polishing units that are arranged in two rows in the gravity direction, that is, the flexible polishing units A, B, C, D, E and F as shown in FIG. 1, wherein the flexible polishing units A, B and C are arranged in one row in the gravity direction, while the flexible polishing units D, E and F are arranged in the other row in the gravity direction; the flexible polishing chambers 31 of the flexible polishing units A, B and C are interconnected in the gravity direction. In this embodiment, the flexible polishing units B and C have the same structure of the flexible polishing unit A; the flexible polishing units D, E and F are respectively installed in a mirrored manner by the central axis of the housing 1 in correspondence to the flexible polishing units A, B and C.

In this embodiment, the bottom of the spreading pipe 15 is forked into branch pipes with a number corresponding to the row number of the flexible polishing units; the feeding inlet of the flexible polishing chamber of the highest flexible polishing unit in each row is interconnected with a branch pipe of the spreading pipe. That is, in this embodiment, the bottom of the spreading pipe 15 is forked into two branch pipes, or the spreading pipe 15 is zigzag. The feeding inlet of the flexible polishing chamber 31 of the highest flexible polishing unit in each row (i.e. the flexible polishing units A and D in FIG. 1) is interconnected with a branch pipe of the spreading pipe 15. A distribution board 16 is disposed at the forked part of the spreading pipe 15; the distribution board 16 can rotate in the spreading pipe 15 to control the flow of two rice flows that enter into the flexible polishing units A and D.

In this embodiment, the bran discharging air duct 26 is disposed inside the housing, and is interconnected with the flexible polishing chamber 31 through a sieve opening on the rice sieve 22; the bottom of the bran discharging air duct 26 is interconnected with the bran discharging hole 28. Thus, strong air is sucked through the air inlet 211 of the hollow shaft, and is then blown into the flexible polishing chamber 31 through the blow holes 212 of the hollow shaft, so that rice bran produced in the flexible polishing chamber 31 is sent to the bran discharging air duct through the sieve openings on the rice sieve 22 and is then discharged through the bran discharging hole 28 that is connected to the bottom of the bran discharging air duct.

In this embodiment, the polishing brush 19 comprises a brush base 20 and brushing hair 191; the brush base 20 is fixedly sleeved on the periphery of the hollow shaft 21; the brushing hair 191 is disposed on the brush base 20; the brush base 20 is provided with a plurality of interconnecting holes 201; the holes 212 of the hollow shaft 21 are interconnected with these interconnecting holes 201 of the brush base 20. Preferentially, the brushing hair 191 is disposed at 360 degrees on the brush base 20. Thus, the polishing brush 19 has a continuous polishing effect on rice, which means that rice entering into the flexible polishing chamber 31 at any time can be polished by the brushing hair 191 of the polishing brush. The polishing brush 19 can be a nano-brush, and the brushing hair can be nano-brushing hair.

In this embodiment, each of the flexible polishing units further comprises a feed chute 17 and a discharge chute 25; the feeding inlet 18 of the highest flexible polishing chamber 31 (i.e. the flexible polishing chamber of the flexible polishing units A and D in FIG. 1) is interconnected with the bottom of the spreading pipe 15 through the feed chute 25, while the discharging outlet of the lowest flexible polishing chamber (i.e. the flexible polishing chamber of the flexible polishing units C and F in FIG. 1) is interconnected with the rice outlet through the discharge chute. For two neighbouring flexible polishing units from top to bottom (i.e. the flexible polishing chambers A and B, B and C, D and E, and E and F), the discharge chute of the upper flexible polishing unit is interconnected with the feed chute of the lower flexible polishing unit.

In this embodiment, the bottom of the bran discharging hole 28 is connected with an air pipe; the bottom of the rice outlet 27 is connected with a slide pipe 29.

In this embodiment, the flexible polishing apparatus for granulated grains further comprises a pedestal 2 fixedly disposed on the bottom of the housing 1; the transmission device comprises motors 3 with a number corresponding to the row number of the flexible polishing units, motor wheels 4 disposed on the output shaft of the motors, driving wheels 6 disposed on the hollow shaft of all the flexible polishing units, and a plurality of driving belts 5; the motors 3 are fixedly disposed on the pedestal 2; each motor wheel 4 and a nearest driving wheel 6 above as well as two neighbouring driving wheels 6 from top to bottom are connected through the driving belt 5.

Specifically, in the embodiment shown in FIG. 1, the transmission device is composed of two secondary transmission devices G and H, wherein the secondary transmission device G comprises a motor 3, a motor wheel 4 disposed on the output shaft of the motor 3, a driving wheel 6 disposed on the hollow shaft 21 of the flexible polishing unit D, a driving wheel 8 disposed on the hollow shaft 21 of the flexible polishing unit E, a driving wheel 10 disposed on the hollow shaft 21 of the flexible polishing unit F, a driving belt 5 connected between the motor wheel 4 and the driving wheel 6, a driving belt 7 connected between the motor wheel 6 and the driving wheel 8, and a driving belt 9 connected between the motor wheel 8 and the driving wheel 10. In this way, the motor 3 drives the motor wheel 4 to rotate when it rotates; the motor wheel 4 transmits the rotation to the driving wheel 6 by belt driving; the driving wheel 6 transmits the rotation to the driving wheel 8 by belt driving; the driving wheel 8 transmits the rotation to the driving wheel 10 by belt driving. Consequently, the motor 3 can rotate to drive the driving wheels 6, 8 and 10 to rotate, thereby driving the hollow shaft 21 connected to the driving wheels 6, 8 and 10 to rotate. Certainly, if the rice only needs to be ground slightly, it can merely pass through one or two of the flexible polishing units D, E and F; a flexible polishing unit that does not need to work can be idled by removing the driving belt on the hollow shaft of the flexible polishing unit.

The secondary transmission device H has a same driving mode as the secondary transmission device G, and is installed opposite to the secondary transmission device G in a mirrored manner by the central axis of the housing 1.

The polishing apparatus for granulated grains in the above embodiment of the present invention can realize multiuse of a machine by controlling the rotating speed of the hollow shaft; the degree of polishing is increased as the rotating speed is growing; relatively high rotating speeds are suitable for the processing of granulated grains that have a high requirement for the degree of polishing, such as highly polished rice, while relatively low rotating speeds are suitable for the processing of granulated grains that have a low requirement for the degree of polishing, such as brown rice and coarse cereals; the surface of the grains is basically well preserved after polishing, which meets the polishing requirements.

The transmission device further comprises one or more than one control device that correspondingly controls the rotating speed of each motor; the control device is a frequency converter or servo controller; the control device controls the rotating speed of the hollow shaft to be 300-1500 rpm by controlling the rotating speed of the motor.

In this embodiment, as shown in FIG. 1, the motor 3 is controlled by the frequency converter, so that the rotating speed of the polishing brush 19 can be adjusted within a specific range. Due to the frequency converter, the rotating speed of the motor 3 can be adjusted; thus, the flexible polishing apparatus 100 for granulated grains can process different varieties of granulated grains. For example, to process brown rice, the parameter of the frequency converter can be set to 20-30 Hz, and the rotating speed of the hollow shaft 21 can be controlled to 300-800 rpm; to process first-grade rice and second-grade rice (as per the national standard), the parameter of the frequency converter can be set to 30-40 Hz, and the rotating speed of the hollow shaft 21 can be controlled to 800-1100 rpm; to process clean polished rice (as per the national standard), the parameter of the frequency converter can be set to 40-50 Hz, and the rotating speed of the hollow shaft 21 can be controlled to 1100-1500 rpm.

The flexible polishing apparatus for granulated grains in the above embodiment of the present invention has the following working process (take rice polishing as an example):

After rice to be polished self flows to the feeding inlet 12 of the polishing apparatus from the storage hopper 11, the flow is limited by a balancing insert plate 13 (via a flow regulating lever 14); the rice spreads out into a flat shape through the spreading pipe 15, and is divided into two rice flows at the distribution board 16. One rice flow enters into the feed chute 17 of the flexible polishing unit A and then moves into the feeding inlet 18 of the flexible polishing unit A; the other rice flow enters into the feed chute of the flexible polishing unit D and then moves into the feeding inlet 18 of the flexible polishing unit D.

As the opening direction of the feeding inlet 18 is along the radial direction of the hollow shaft 21, the rice to be polished is driven by the high-speed rotation of the polishing brush 19 to enter into the flexible polishing chamber A after radially entering into the feeding inlet 18 of the flexible polishing unit A; the rice fully contacts with the polishing brush 19, and rolls under the combined acting force of flexible extrusion force and centrifugal force produced by the polishing brush 19; rubbing effects are produced between rice and rice, as well as between the rice and the polishing brush 19 and between the rice and the rice sieve 22, so that moth eggs, rice bran and aleurone layer adhered to the rice surface are stripped off; as the combined acting force continues, the uneven aleurone layer (above mean peak of surface convex-concave curve) on the rice surface is smoothened. The moth eggs, rice bran and aleurone layer (collectively referred to as polishing powder) and fine broken rice smaller than the mesh size of the rice sieve (1-1.2*10 mm) are mixed with air blown from the hollow shaft 21; they are immediately strongly sucked by a blast blower assorted with the apparatus into the bran discharging air duct 26 through the rice sieve, and then are discharged into an external air pipe 30 through the bran discharging hole 28.

The primarily polished rice enters into the discharge chute 25 of the flexible polishing unit A through the discharging outlet 24 of the flexible polishing unit A, and then enters into the flexible polishing unit B below; it then enters into the flexible polishing unit C for third polishing after being polished by the flexible polishing unit B. The rice fully meets the quality requirement after being polished for three times; it enters into the rice outlet 27, and is discharged through the slide pipe 29.

The flexible polishing units B, C, D, E and F have the same working principles as the flexible polishing unit A. The two rice flows are assembled at the rice outlet after being polished.

The flexible polishing apparatus for granulated grains in this embodiment has six flexible polishing units in two rows, being suitable for high output rice polishing.

The present invention is designed according to the principles that a rice polishing apparatus should completely prevent the rice from being stressed by the shear force, minimize the extrusion force on the rice and increase the friction force on the surface of the rice. The flexible polishing apparatus for granulated grains provided by the present invention avoids the shear effect of rice in the polishing chamber, improves the flexible friction effect, and greatly reduces the damage to the rice in the polishing process while ensuring that rice bran powder is cleaned and the rice is polished, thereby improving the rate of polished rice and reducing energy consumption. Besides, it has the following advantages:

1. moderate processing of rice is realized, no skin injury is caused, and the yield is improved; as the feeding device, the radial gravity self-flow flexible polishing unit and the rice outlet are sequentially arranged from top to bottom along the gravity direction, the rice enters into the flexible polishing chamber of the flexible polishing unit from the feeding device by gravity alone, that is, the rice flows into the flexible polishing chamber along the radial direction of the hollow shaft through the feeding inlet; the rice contacts with the rotating flexible polishing member for radial polishing between the rice sieve and the baffle; by means of flexible friction between the rice and the flexible polishing member, semi-rigid friction between the rice and the rice sieve and rigid friction between the rice and rice, the rice bran powder in the surface curve grooves of the rice is stripped off, and peaks that are above the average height of the surface curve of the rice are properly smoothened (not fully ground to the root of the peak); the polished rice has a matte color (commonly known as "matte rice"), and flows out of the rice outlet; in comparison with existing spirally propelling roll polishers, the present invention omits the propelling roll; thus, single rice enters into the rotating flexible polishing member of the flexible polishing chamber for radial polishing in a cascading manner from top to bottom; the feeding mode that rice enters into the flexible polishing chamber by means of radial gravity flow prevents the rice from being stressed by axial thrust in the flexible polishing chamber, but allows it to slightly axially flow under its own gravity; thus, when flowing from top to bottom, the rice merely bears its own gravity and the acting force of the rotating polishing brush; consequently, during the polishing process, the shear force is prevented, the extrusion force is minimized, and the friction force is increased by the flexible polishing member like the polishing brush; therefore, the surface of the rice merely endures a slight extrusion force and a large friction force, thereby realizing moderate processing on the rice; the present invention overcomes the skin injury problem of roll polishers in the prior art, which is resulted as the surface pressure of the rice cannot be regulated during the rigid spiral propelling process, prevents broken rice from being produced during the polishing process, and improves the rate of polished rice by 0.5-2% compared with the prior art;

2. a small amount of rice bran powder is produced, the polishing is uniform, and the product percent of pass is high; as the rice is not deeply ground, but is moderately or slightly ground during the polishing process, a small amount of rice bran powder, merely 0.5% below, is produced; the rice is fully rolled during the polishing process; the bran discharging air duct is disposed inside the housing; the flexible polishing member is disposed on the hollow shaft; the hollow shaft is provided with an air inlet and a plurality of blow holes that are interconnected with the flexible polishing chamber; the bran discharging air duct is interconnected with the flexible polishing chamber through the sieve opening on the rice sieve; the bottom of the bran discharging air duct is interconnected with the bran discharging hole; in this way, air entering through the air inlet on the hollow shaft is radially blown into the flexible polishing chamber; it passes through the rice, enters into the bran discharging air duct through the sieve opening on the rice sieve, and is sucked by the blast blower to produce strong air; when the produced rice bran is blown away, the rice is fully rolled and uniformly polished, thus bringing about high product percent of pass;

3. the energy conservation effect is significant; as single rice enters into the flexible polishing chamber in a cascading manner from top to bottom without power, the polishing process omits the axial propelling feeding process, and moderate or slight flexible polishing is carried out alone in the flexible polishing chamber, a low-power power unit is needed; usually, a 15 KW power unit (for example, two 7.5 KW motors) needs to be configured for a 7 TPH apparatus weighing 2350 kg; therefore, in comparison with the existing iron roll polisher with a 75 KW motor, the present invention can save about 80% of energy; and 4. the apparatus has small floor space and low cost; it can save 50% of floor space compared with the roll polishers in the prior art; as the present invention does not need the propelling roll, the number of transmission parts and consumables are largely reduced, thus lowering the fabrication cost of the apparatus.

The flexible polishing apparatus for granulated grains according to the above embodiment of the present invention can greatly improve the yield by 0.5%-2% in comparison with a traditional iron roll polisher. That is, 50-200 tons of rice is increased per 10,000 tons of rice processed. Annually 0.2 billion tons of rice is processed all over China. If 1% of enterprises adopt the flexible polishing apparatus for granulated grains according to the above embodiment of the present invention, 10,000-40,000 tons of rice can be increased.

Besides, compared with a traditional iron roll polisher, the flexible polishing apparatus for granulated grains according to the above embodiment of the present invention can save over 80% of energy (for example, for a 150 TPD rice production line, the above embodiment of the present invention only needs to dispose two 7.5 Kw motors, while a frequently used iron roll polisher needs to dispose a 75 Kw motor). The flexible polishing apparatus can save 86,400 kwh of electricity for the processing of 10,000 tons of rice. Annually 0.2 billion tons of rice is processed all over China. If 1% of enterprises adopt the flexible polishing apparatus for granulated grains according to the above embodiment of the present invention, 172.8 million kwh of electricity can be saved.

Besides, compared with a traditional iron roll polisher, the flexible polishing apparatus for granulated grains according to the above embodiment of the present invention can increase 0.1-0.4 million yuan of profit from processing 10,000 tons of rice due to high yield; plus 0.048 million yuan of saved electric charge, totally 0.148-0.448 million yuan of expenditures can be reduced. Annually 0.2 billion tons of rice is processed all over China. If 1% of enterprises adopt the flexible polishing apparatus for granulated grains according to the above embodiment of the present invention, 0.2-0.8 billion yuan of profit can be increased due to high yield; plus 86.4 million yuan of saved electric charge, totally 0.2864-0.8864 billion yuan of expenditures can be reduced. Therefore, the economic benefits are remarkable.

The number and layout of the flexible polishing units as well as the rotating speed of the motors can be adjusted for different rice to be polished (for example, white rice or brown rice), different output and different rice quality requirements (for example, highly or slightly polishing).

Figure 3:
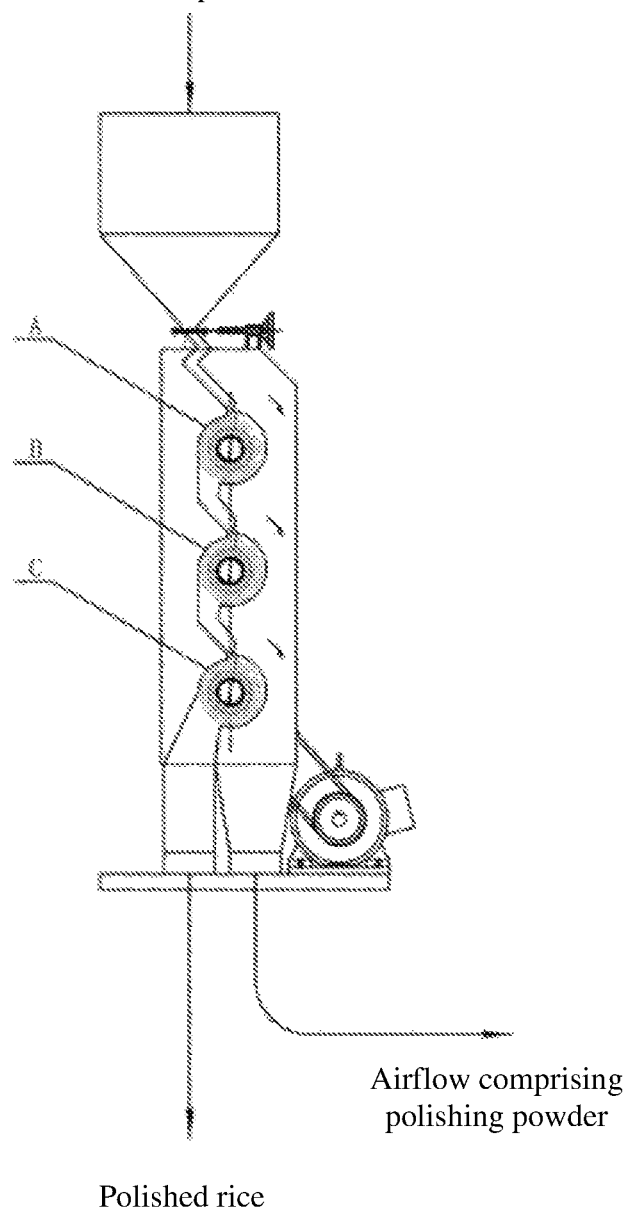
FIG. 3 is a structural schematic figure of a flexible polishing apparatus for granulated grains according to another embodiment of the present invention.

As shown in FIG. 3, a flexible polishing apparatus for granulated grains according to another embodiment of the present invention is different from the embodiment as shown in FIG. 1 in that, in this embodiment, only one row of flexible polishing units, that is, the flexible polishing units A, B and C that are arranged from top to bottom, are disposed in the gravity direction. Correspondingly, in this embodiment, the transmission device comprises only the secondary transmission device G or H. The flexible polishing apparatus for granulated grains in this embodiment is suitable for low output white rice polishing.

Figure 4:
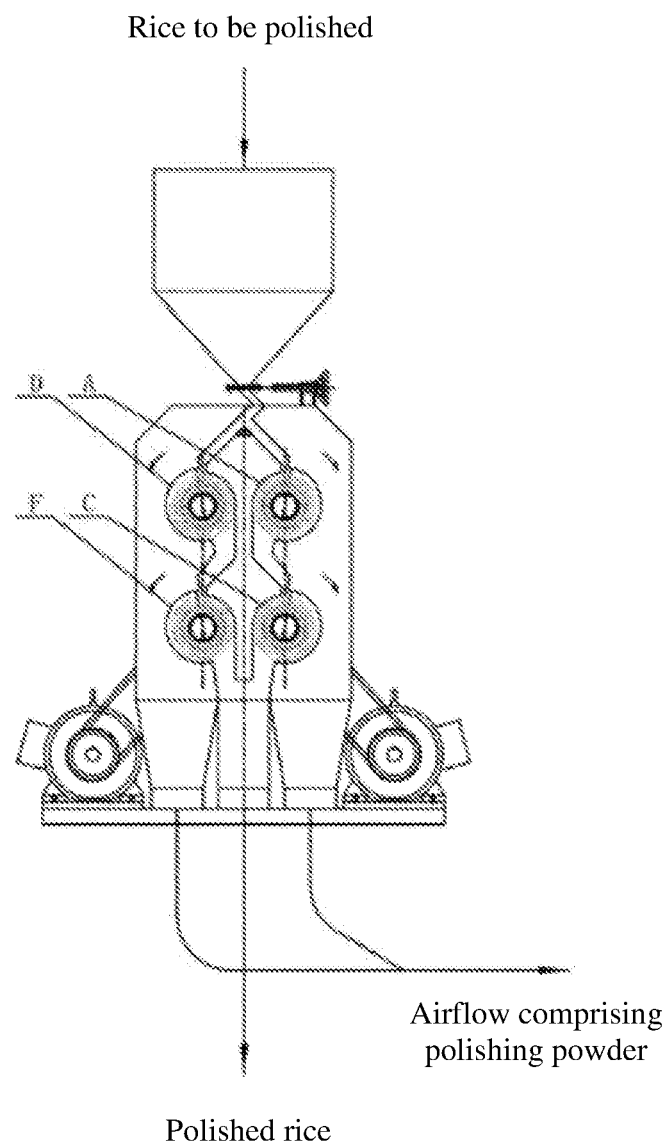
FIG. 4 is a structural schematic figure of a flexible polishing apparatus for granulated grains according to another embodiment of the present invention.
Figure 5:
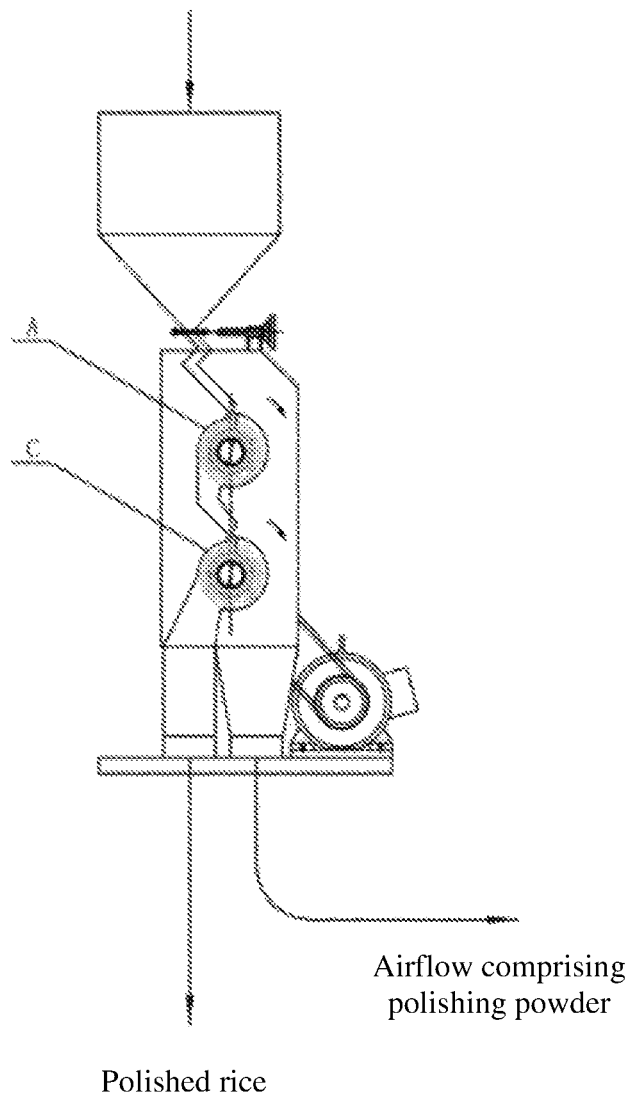
FIG. 5 is a structural schematic figure of a flexible polishing apparatus for granulated grains according to another embodiment of the present invention.

As shown in FIG. 4, a flexible polishing apparatus for granulated grains according to another embodiment of the present invention is different from the embodiment as shown in FIG. 1 in that, in this embodiment, two rows of flexible polishing units are disposed in the gravity direction, each including two flexible polishing units that are arranged from top to bottom, that is, the flexible polishing units A and C are arranged from top to bottom in one row, while the flexible polishing units D and F are arranged from top to bottom in the other row. The flexible polishing apparatus for granulated grains in this embodiment is suitable for high output brown rice polishing.

As shown in FIG. 4, a flexible polishing apparatus for granulated grains according to another embodiment of the present invention is different from the embodiment as shown in FIG. 2 in that, in this embodiment, only one row of flexible polishing units are disposed in the gravity direction, which includes two flexible polishing units, that is, the flexible polishing units A and C that are arranged from top to bottom. The flexible polishing apparatus for granulated grains in this embodiment is suitable for low output brown rice polishing.

Certainly, in another embodiment, only one row of flexible polishing units can also be disposed in the gravity direction, which includes one or more than four flexible polishing units.

Certainly, in another embodiment, two rows of flexible polishing units can also be disposed in the gravity direction, each including more than four flexible polishing units.

Certainly, in another embodiment, three rows of flexible polishing units can also be disposed in the gravity direction, each including more than one flexible polishing unit.

Figure 6:
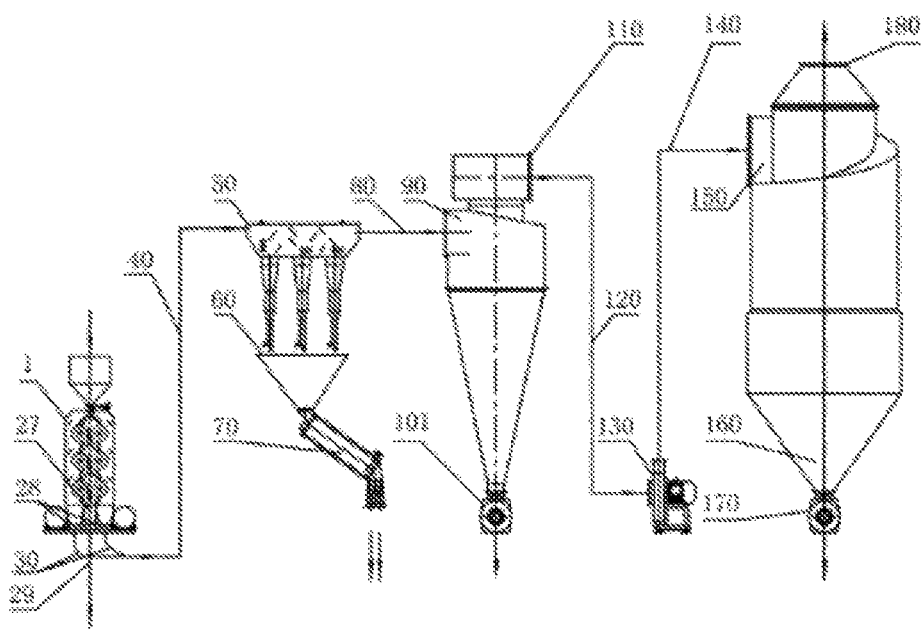
FIG. 6 is a structural schematic figure of rice processing equipment according to an embodiment of the present invention.
Figure 7:
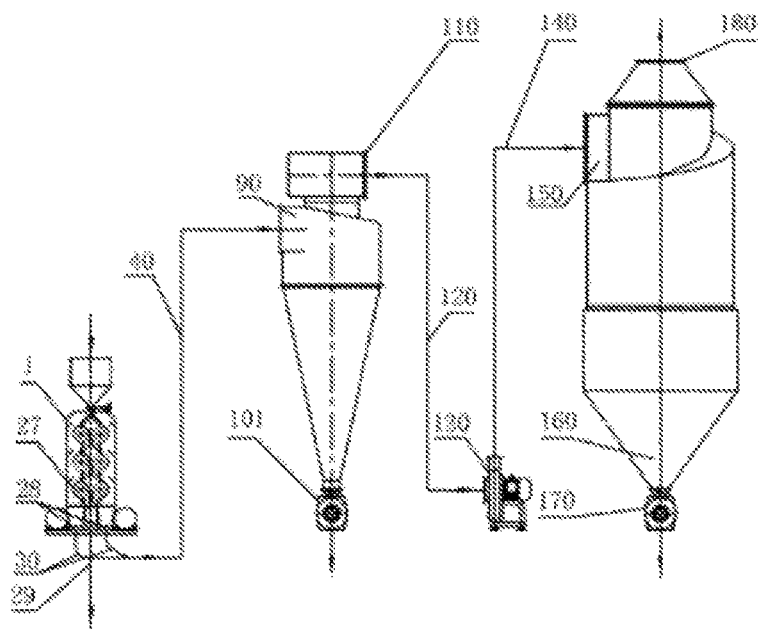
FIG. 7 is a structural schematic figure of rice processing equipment according to another embodiment of the present invention.

Further, as shown in FIG. 6, an embodiment of the present invention further provides rice processing equipment, comprising the flexible polishing apparatus 100 for granulated grains, a first pipe 40, a bran and fine broken rice separator 50, a first collecting hopper 60, a vibrating fine broken rice sieve 70, a second pipe 80, a cyclone dust collector 90, a diverter 110, a first airlock 101, a third pipe 120, a blast blower 130, a fourth pipe 140, a bran dust remover 150, a second collecting hopper 160 and a second airlock 170, wherein one end of the first pipe 40 is connected with a rice outlet 27 of the flexible polishing apparatus for granulated grains, while the other end is connected with an inlet of the bran and fine broken rice separator 50; the first collecting hopper 60 is disposed under the bran and fine broken rice separator 50; the vibrating fine broken rice sieve 70 is disposed under the first collecting hopper 60; one end of the second pipe 80 is connected with the outlet of the bran and fine broken rice separator 50, while the other end is connected with the cyclone dust collector 90; the diverter 110 is disposed on the top of the cyclone dust collector 90; the first airlock 101 is disposed on the bottom of the cyclone dust collector 90; one end of the third pipe 120 is connected with the diverter 110, while the other end is connected with the blast blower 130; one end of the fourth pipe 140 is connected with the blast blower 130, while the other end is connected with the bran dust remover 150; the top of the bran dust remover 150 is provided with a bran dust remover outlet 180; the second collecting hopper 160 is disposed on the bottom of the bran dust remover 180; the second airlock 170 is disposed on the bottom of the second collecting hopper 160.

The rice processing equipment according to the above embodiment of the present invention has the following working principles:

rice to be polished flows out of the rice outlet 27 of the flexible polishing apparatus 100 for granulated grains; polishing powder produced during the polishing process enters into the first pipe 40 through the bran discharging hole 28 along with a negative pressure airflow produced by the blast blower 130, and then enters into the bran and fine broken rice separator 50 for separation; the separated fine broken rice flows into the vibrating fine broken rice sieve 70 through the first collecting hopper 60; after being vibrated and sifted, broken rice over 1 mm and broken rice below 1 mm are separated and are packaged for further use; the polishing powder free from fine broken rice enters into the cyclone dust collector 90 through the second pipe 80; after the polishing powder is separated by the cyclone dust collector 90, most of the polishing powder is discharged through the first airlock 101; very little polishing powder enters into the third pipe 120 along with the airflow through the diverter 110 on the top of the cyclone dust collector 90; then it enters into the bran dust remover 150 through the blast blower 130 and the fourth pipe 140; remaining polishing powder falls into the collecting hopper 60 after spiral separation and gravity settling by the bran dust remover 150, and is discharged through the second airlock; a clean airflow is discharged through the bran dust remover outlet 180.

Further, as shown in FIG. 6, another embodiment of the present invention further provides rice processing equipment, which is different from embodiment 1 in that, in this embodiment, the bran and fine broken rice separator 50, the first collecting hopper 60, the vibrating fine broken rice 80 and the second pipe 80 are omitted, and the first pipe 40 is directly connected to the cyclone dust collector 90. The rice processing equipment of the embodiment does not separate bran and fine broken rice.

The above description is only for the purpose of describing preferred embodiments of the present invention and is not intended to limit the present invention; any modifications, equivalent substitutions, and improvements made within the spirit and principles of the present invention shall fall within the protection scope of the present invention.

The invention claimed is:

1. A flexible polishing apparatus for granulated grains, comprising:
   a housing;
   a feeding device;
   at least one flexible polishing unit;
   a bran discharging device; and
   a rice outlet,
   wherein the flexible polishing unit comprises a radial gravity self-flow flexible polishing chamber,
   wherein the feeding device, the flexible polishing chamber and the rice outlet are sequentially arranged from top to bottom along a gravity direction such that the granulated grains are moved through the flexible polishing chamber along a radial direction of a hollow shaft by gravity,
   wherein the flexible polishing chamber is disposed inside the housing; the flexible polishing chamber is enclosed by a rice sieve and a baffle; a center of the flexible polishing chamber is provided with the hollow shaft; the hollow shaft is provided with a flexible polishing member; a feeding inlet and a discharging outlet are respectively formed on a top and bottom of the flexible polishing chamber; an opening direction of the feeding inlet is along a radial direction of the hollow shaft; the hollow shaft is provided with at least one air inlet and a plurality of blow holes that are interconnected with the flexible polishing chamber; the hollow shaft is driven to rotate by a transmission device, and wherein the flexible polishing member is a polishing brush sleeved outside the hollow shaft; the polishing brush comprises a brush base and brushing hair; the brush base is fixedly sleeved on a periphery of the hollow shaft; the brushing hair is disposed on the brush base; the brush base is provided with a plurality of interconnecting holes configured for connecting to the hollow shaft;

wherein the feeding device comprises a storage hopper and a spreading pipe; a bottom of the spreading pipe is interconnected with the feeding inlet of a highest flexible polishing chamber in the flexible polishing unit, so that rice flows into the flexible polishing chamber radially inward with respect to the hollow shaft, wherein the flexible polishing apparatus for granulated grains comprises a plurality of the flexible polishing units that are arranged in one or more than one row in the gravity direction; the flexible polishing units in one row each comprise more than one flexible polishing chamber.

2. The flexible polishing apparatus for granulated grains according to claim 1, wherein the discharging outlet of a lowest flexible polishing chamber in the flexible polishing unit is interconnected with the rice outlet; the bran discharging device is disposed on one side of the rice sieve and is connected with the polishing chamber through a sieve opening on the rice sieve; the bran discharging device comprises a bran discharging air duct inside the housing and a bran discharging hole on a bottom of the bran discharging air duct.

3. The flexible polishing apparatus for granulated grains according to claim 2, wherein the brushing hair is disposed at 360 degrees on the brush base.

4. The flexible polishing apparatus for granulated grains according to claim 1, wherein two or more air inlets are disposed on both ends of the hollow shaft.

5. The flexible polishing apparatus for granulated grains according to claim 1, wherein the more than one flexible polishing chambers are interconnected in the gravity direction; the bottom of the spreading pipe is forked into branch pipes with a number corresponding to a row number of the flexible polishing units; the feeding inlet of the flexible polishing chamber of the highest flexible polishing unit in each row is interconnected with one of the branch pipes of the spreading pipe, while the discharging outlet of the lowest flexible polishing chamber is interconnected with the rice outlet.

6. The flexible polishing apparatus for granulated grains according to claim 5, wherein the transmission device comprises motors with a number corresponding to the row number of the flexible polishing units, motor wheels disposed on an output shaft of the motors, driving wheels disposed on the hollow shaft of all the flexible polishing units, and a plurality of driving belts; the motors are fixedly disposed on a pedestal; each motor wheel and a nearest driving wheel above as well as two neighbouring driving wheels from top to bottom are connected through the driving belt.

7. The flexible polishing apparatus for granulated grains according to claim 2, wherein two or more air inlets are disposed on both ends of the hollow shaft.

8. The flexible polishing apparatus for granulated grains according to claim 3, wherein two or more air inlets are disposed on both ends of the hollow shaft.

9. The flexible polishing apparatus for granulated grains according to claim 2, wherein the more than one flexible polishing chambers are interconnected in the gravity direction; the bottom of the spreading pipe is forked into branch pipes with a number corresponding to a row number of the flexible polishing units; the feeding inlet of the flexible polishing chamber of the highest flexible polishing unit in each row is interconnected with one of the branch pipes of the spreading pipe, while the discharging outlet of the lowest flexible polishing chamber is interconnected with the rice outlet.

10. The flexible polishing apparatus for granulated grains according to claim 3, wherein the more than one flexible polishing chambers are interconnected in the gravity direction; the bottom of the spreading pipe is forked into branch pipes with a number corresponding to a row number of the flexible polishing units; the feeding inlet of the flexible polishing chamber of the highest flexible polishing unit in each row is interconnected with one of the branch pipes of the spreading pipe, while the discharging outlet of the lowest flexible polishing chamber is interconnected with the rice outlet.

11. The flexible polishing apparatus for granulated grains according to claim 9, wherein the transmission device comprises motors with a number corresponding to the row number of the flexible polishing units, motor wheels disposed on an output shaft of the motors, driving wheels disposed on the hollow shaft of all the flexible polishing units, and a plurality of driving belts; the motors are fixedly disposed on a pedestal; each motor wheel and a nearest driving wheel above as well as two neighbouring driving wheels from top to bottom are connected through the driving belt.

12. The flexible polishing apparatus for granulated grains according to claim 10, wherein the transmission device comprises motors with a number corresponding to the row number of the flexible polishing units, motor wheels disposed on an output shaft of the motors, driving wheels disposed on the hollow shaft of all the flexible polishing units, and a plurality of driving belts; the motors are fixedly disposed on a pedestal; each motor wheel and a nearest driving wheel above as well as two neighbouring driving wheels from top to bottom are connected through the driving belt.

* * * * *